United States Patent [19]

Platz, deceased et al.

[11] 4,164,541
[45] Aug. 14, 1979

[54] VENTURI MIXER

[76] Inventors: Edward A. Platz, deceased, late of Belle Mead, N.J.; by Zelma H. Platz, executor, Opossum Rd., R.R. #2; by William Lubas, executor, Kildee Rd., R.R. #2, both of Belle Mead, N.J. 08502

[21] Appl. No.: 743,949

[22] Filed: Nov. 22, 1976

[51] Int. Cl.² ............... C05B 7/00; B01F 5/00; B01J 1/00
[52] U.S. Cl. .................. 422/198; 422/205; 422/230; 422/234; 261/76
[58] Field of Search ............ 23/259.1, 259.2, 283, 23/284, 285; 261/76, DIG. 75; 417/174

[56] References Cited

U.S. PATENT DOCUMENTS

| 141,361 | 7/1873 | Korting | 417/174 X |
|---|---|---|---|
| 2,572,338 | 10/1951 | Hartwig et al. | 23/284 |
| 2,823,243 | 2/1958 | Robinson | 23/284 X |
| 2,974,090 | 3/1961 | Schmidt | 202/135 X |
| 3,512,219 | 5/1970 | Stern et al. | 23/284 X |
| 3,759,669 | 9/1973 | Aaron et al. | 23/283 X |
| 4,000,001 | 12/1976 | Toth | 23/283 X |
| 4,014,961 | 3/1977 | Popov | 261/76 |
| 4,019,983 | 4/1977 | Maudt | 261/76 X |

Primary Examiner—Morris O. Wolk
Assistant Examiner—Michael S. Marcus
Attorney, Agent, or Firm—Sherman & Shalloway

[57] ABSTRACT

Apparatus for producing a product such as fertilizer which has acidic and basic constituents having, a venturi pump and a mixing tank. The venturi pump is powered by mixing the constituents in a reaction chamber and expelling the resulting product through a venturi tube. The venturi tube entrains additional product adjacent to the entrance of the tube and expels the additional product along with the product just produced by the reaction in order to mix the product in the tank.

14 Claims, 6 Drawing Figures

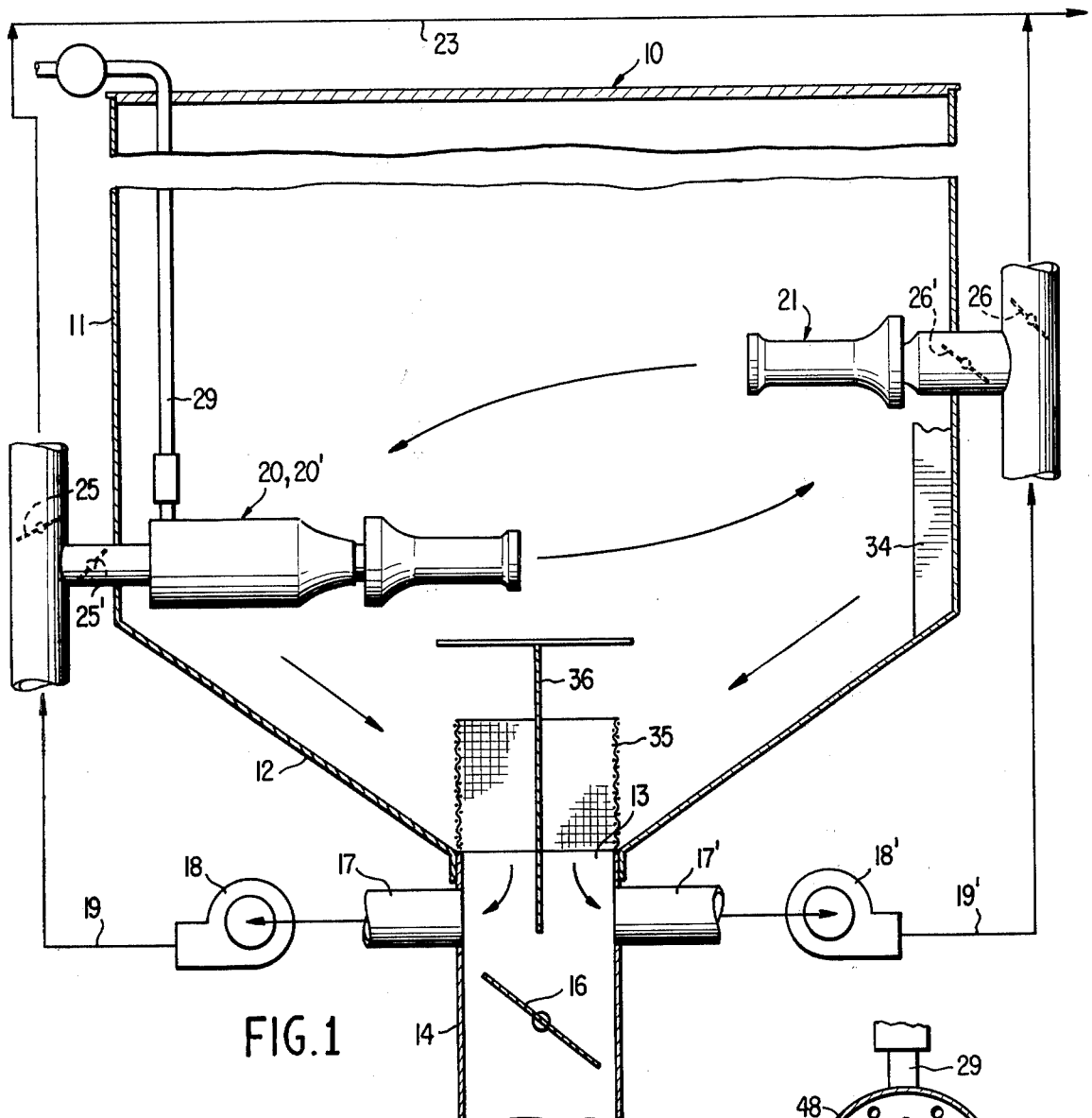
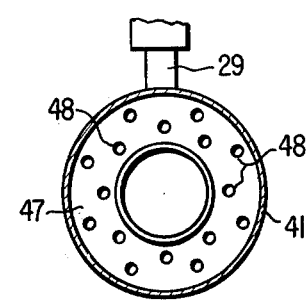
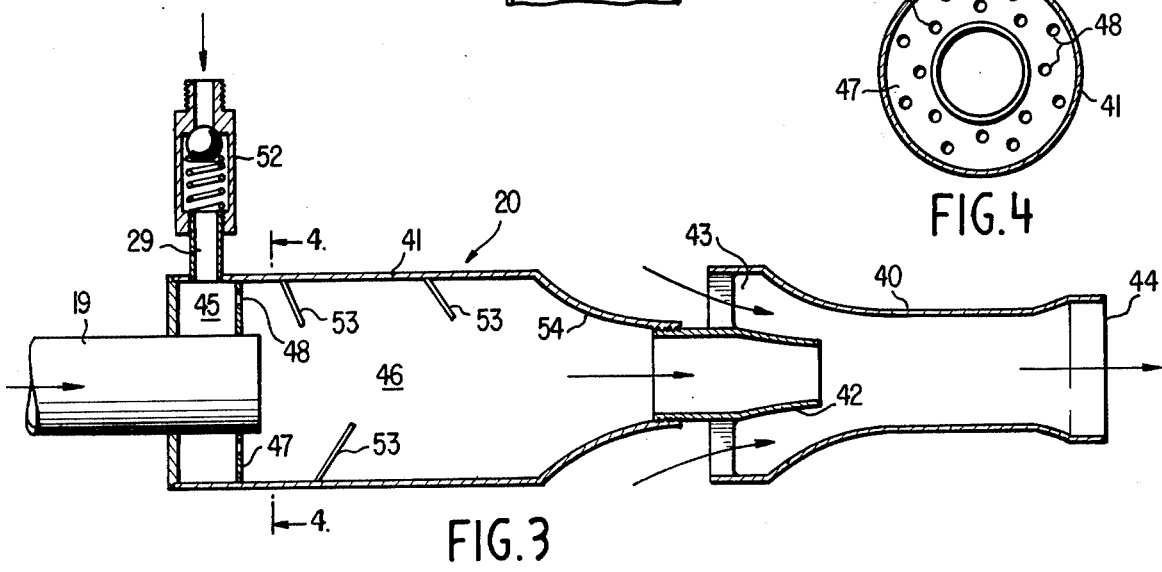
FIG.1
FIG.4
FIG.3

VENTURI MIXER

BACKGROUND OF THE INVENTION (1) Field of the Invention

This invention relates to mixers, and more particularly this invention relates to mixers for liquid materials.

(2) Technical Considerations and Prior Art

In the preparation of products such as fertilizers, it is often necessary to react a base and acid in order to produce the product. After the acid and base have been reacted, it is necessary to continue mixing the product in order to produce a product having a near neutral pH and to add other ingredients necessary to create the desired characteristics and chemical analysis.

Heretofore, the considerable energy created during the reaction between the acid and the base has been wasted. In addition, it has been necessary to expand considerable amounts of electrical energy in order to mix the resulting product. The cost of the electrical energy in order to mix the product is reflected in the cost of the product to the purchaser. If the product happens to be fertilizer, there are great quantities of fertilizer produced and used and, therefore, the energy cost involved in mixing fertilizer is considerable.

In view of these considerations, a method and apparatus for mixing products such as fertilizers with a minimum expenditure of electrical energy would be highly desirable.

OBJECTS OF THE INVENTION

It is, therefore, an object of the instant invention to provide a new and improved method and apparatus for mixing products such as fertilizers.

It is still another object of the instant invention to provide a new and improved method and apparatus for mixing fertilizers wherein the products are mixed with a minimal expenditure of energy.

It is still another object of the instant invention to provide a new and improved method and apparatus for mixing products such as fertilizers wherein the energy expended to produce the products is utilized to help mix the products.

It is still a further object of the instant invention to provide a new and improved method and apparatus for mixing products such as fertilizers wherein the energy expended to produce the products operates a venturi which entrains prior produced product and circulates the product in order to mix it.

It is another object of the instant invention to provide a new and improved apparatus for and method of ammoniation (or neutralization) of acids which prevent the lumping of the salts formed.

It is still another object of the instant invention to provide a new and improved method of and apparatus for replacing conventional tank spargers which are slow to neutralize acids in fluid fertilizer production with a confined reaction chamber in which fast acid neutralization occurs in a high velocity flow, thus considerably reducing production time.

SUMMARY OF THE INVENTION

In view of the aforementioned consideration, the instant invention contemplates a method of and apparatus for mixing a product wherein the product is produced by a reaction between an acid and a base and wherein the energy released by the reaction is used in mixing the product. This is accomplished by ejecting the product as it is formed in a reaction chamber through a venturi tube which entrains previously formed product thereby moving the previously formed product. Preferably, the venturi is mounted in a tank having a lower conical section with an opening in the bottom thereof. The product produced is selectively passed back through the venturi to power the venturi or it is passed out of the system if sufficiently mixed.

In structure, the venturi is mated with a reaction chamber that is divided into two sections by an annular perforated wall. The first section serves as an induction chamber for either the base or the acid. A pipe passes through the induction chamber and registers with the opening in the center of the annular wall. Either an acid or base is introduced through the pipe to react with the base or acid introduced into the induction chamber when the acid or base introduced into the induction chamber passes into the second chamber, which serves as a reaction chamber. The reaction chamber includes means which assist in mixing the acid and base to promote the reaction therebetween. Downstream from the second section or reaction chamber, a converging nozzle directs the product resulting from the reaction into the venturi tube.

BRIEF DESCRIPTION OF THE DRAWINGS

FIG. 1 is a side view, partially in section, showing a mixing tank for fertilizers which utilizes venturi pumps in accordance with principles of the instant invention.

FIG. 3 is a side view, in section, of one embodiment of a venturi pump according to the instant invention.

FIG. 4 is a view taken along line 3—3 of FIG. 3 showing a perforated wall which is used to separate an induction chamber from a reaction chamber of the venturi pump shown in FIG. 3.

DETAILED DESCRIPTION

Figure 2:
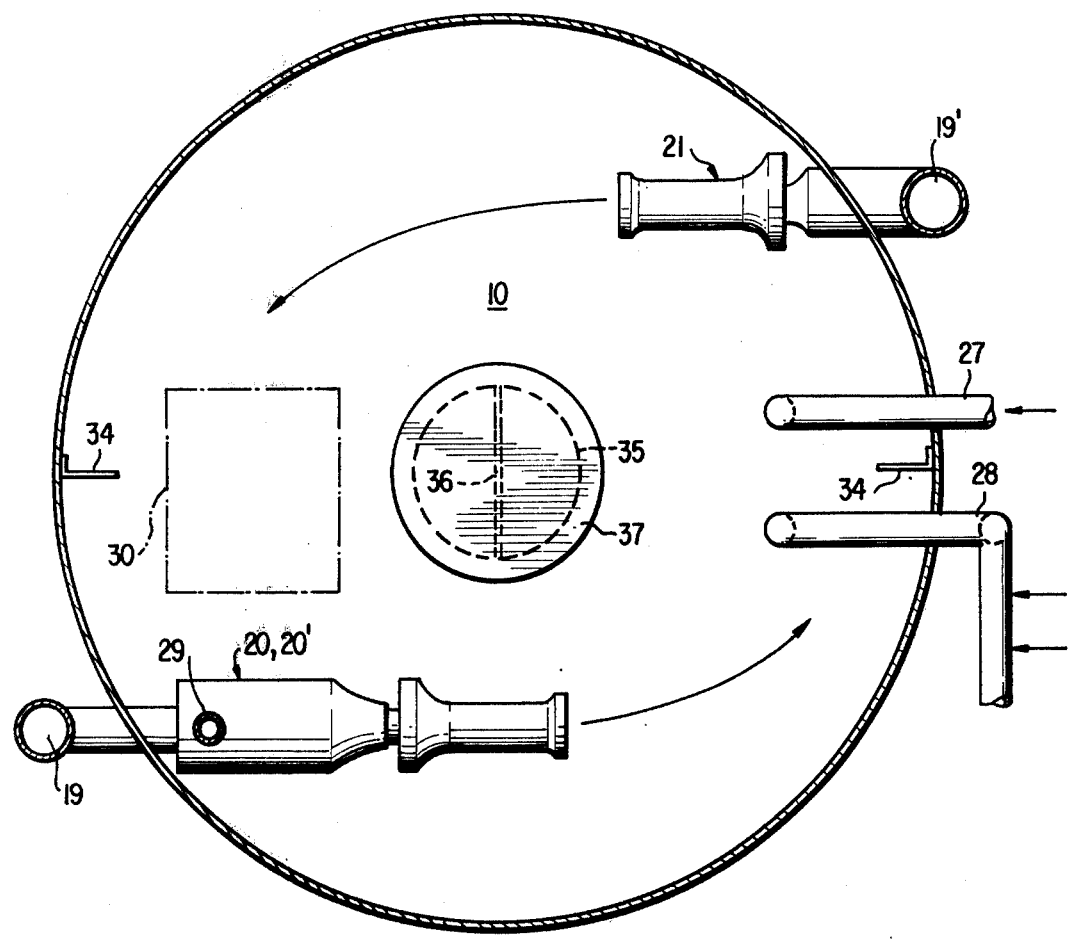
FIG. 2 is a top view of the mixing tank of FIG. 1.

Referring now to FIGS. 1 and 2, there is shown a mixing apparatus according to the instant invention which includes a tank, generally designated by the numeral 10, having a cylindrical portion 11 and a conical bottom portion 12. The conical bottom portion has a suction port 13 at the apex thereof which registers with an outlet pipe 14. Fertilizer is mixed in the tank 10 and is removed from the tank by the outlet pipe 14. The outlet pipe 14 includes a valve 16 which, when in a first position, allows the contents of the tank 11 to be dumped out of the pipe and, when in a second position, directs the contents into a pair of lateral pipes 17 and 17'. The lateral pipes 17 and 17' are connected to electric auxiliary pumps 18 and 18'. The pumps 18 and 18' have outlet lines 19 and 19' which are connected selectively with first and second venturi pumps, designated generally by the numerals 20 and 21, respectively, or with an outlet pipe 23. If the product is sufficiently mixed, it will be passed out of the system via the pipe 23, and if the product is insufficiently mixed, it will be passed through the venturi pumps 20 and 21 for additional agitation. Removal of the product is accomplished by opening valves 25, 25' and 26, 26' in lines 19 and 19', respectively and closing the valves 25' and 26' of venturies 20 and 21 respectively.

In the embodiment shown in FIGS. 1 and 2, the venturi pump 20 is a reaction type pump which is powered by the chemical reaction between an acid and base, whereas the venturi pump 21 is simply powered by the flow of the product from the electrical pump 18'.

In mixing fertilizers, and acid (generally phosphoric acid) is initially introduced into the tank through line 27 and other ingredients may be introduced through a manifold line 28. Dry powdered or granular ingredients may be dropped through the top of the tank 10 or through an opening 30 in the top of the tank. A base is introduced into the system via an inlet line 29 which is connected to the venturi pump 20. The acid reacts with the base and the resulting product expands through the venturi pump and entrains additional product which is mixed with the acid and circulated in the tank 10. The pump 18 continually supplies fresh acid through the pipe 19, which is directed by the valve 25 in the closed position and valve 25' in the open position into the venturi pump 20, where it mixes with the base coming in line 29. As the acid and base interact, they produce a salt which exits from the reaction section of the venturi 20 and entrains additional acid already in the tank so as to mix the acid with the salt. The resulting product is then again circulated and mixed with a base coming in line 29 until a product having the desired pH is obtained. As is seen in FIG. 1, the venturi pump 21 helps to circulate the product but does not utilize the reaction principle for power.

In order to prevent clogging of electric pumps 18 and 18' sand venturi pumps 20 and 21, a cylindrical screen 35 is positioned adjacent the opening 13 and the conical bottom section 12 of the tank 10. As the venturi pumps 20 and 21 discharge, the product obliquely strikes the side wall of the tank 10 and, deflected by baffles 34, slides down toward the opending 13. Any large chunks of material will then be stopped by the screen 35.

A divider plate 36 bisects the opening 13 so that half the product goes to pipe 17 while the other half goes to pipe 17'. In order to prevent the product from swirling while exiting, an anti-vortex plate 37 is positioned on top of the divider plate 36.

When emptying the tank 10, the valve 16 can be used to dump the product out without operating the pumps 18 and 18', or the product may be dumped through the pipe 23 by the operation of the electric pumps 18 and 18', when valves 25 and 26 are open and valves 25' and 26' are closed.

Referring now to FIGS. 3 and 4, where the first embodiment of venturi pump 20 is shown in detail, it is seen that the first embodiment of the venturi pump 20 consists of two basic sections, a venturi tube 40 and a reactor 41. The reactor 41 has a nozzle 42 which projects into the venturi tube 40 so that fluid leaving the nozzle 42 will create a low pressure in the venturi tube 40. This causes fluid in the venturi tube, and fluid adjacent the inlet 43 of the venturi tube, to be sucked into the venturi tube and to leave the tube at a relatively high velocity via the exit 44. The reactor 41 is divided into an induction chamber 45 and a reaction chamber 46 by a perforated annular wall 47. The wall 47 has small holes 48 therein and a large central aperture 49. The induction chamber 45 receives the base from the line 29 and the base is passed through holes 48 in the wall 47 to the reaction chamber 46. A one-way ball check valve 52 is positioned in the line 29 to prevent backflow into the line 29.

The acid is introduced into the reaction chamber 46 via the line 19 which registers with the aperture 49 in the wall 47. When the base and acid come into contact with one another, they react to form a salt and in the process release energy. This energy results in heat and expansion of the product out through the nozzle 42 and through the venturi tube 40. In order to enhance mixing of the acid and base, the reaction chamber 45 has baffles 53 which project into the reaction chamber and are angled downstream. In order to compress the flow of the expanding fluid resulting from the reaction, the reaction chamber 46 has a concical mouth 54 which has concave walls and tapers toward the nozzle 42.

At times, it is desirable to operate the mixing tank 10 without using the reaction to power the venturi pump. By designing the venturi pump as described above, the product will flow from the pipe 19 smoothly through the reaction chamber 46 and out of the nozzle 42 without excessive interference from the baffles 53. The baffles 53 extend into the chamber 46 a distance which is no greater than the distance the wall 47 projects into the reaction chamber. When there is a base pumped into the induction chamber 45, it is deflected into the stream of acid by the baffles 53 to enhance the reaction, however, when there is no acid being pumped, there is minimal interference.

It has been found that this system is particularly suitable for manufacturing fertilizers, in which case the usual approach is to pump the base into the induction chamber 45 while pumping acid through the pipe 19. It should be kept in mind, however, that this arrangement could be reversed and the base could be pumped in through line 19 while the acid is pumped in through line 29. When the latter approach is followed, extra caution should be exercised and only nonvolatile base solutions can be used because the mixing tank 10 is open to the atmosphere and fumes will escape.

The usual base used in fertilizer manufacture is ammonia and the inlet line 29 and the induction chamber 45 are isolated from the atmosphere. When the ammonia reacts with the acid in the reactor 20', the ammonia fumes are absorbed within the reacted acid. By keeping the temperature below 170° F. and the pH below 7.5, no ammonia loss is incurred.

Figure 6:
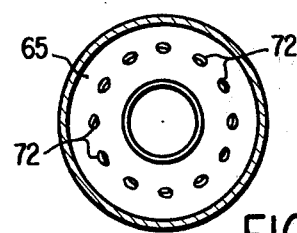
FIG. 6 is a section taken along line 6—6 of FIG. 5 showing a perforated wall used to separate an induction chamber and reaction chamber.
Figure 5:
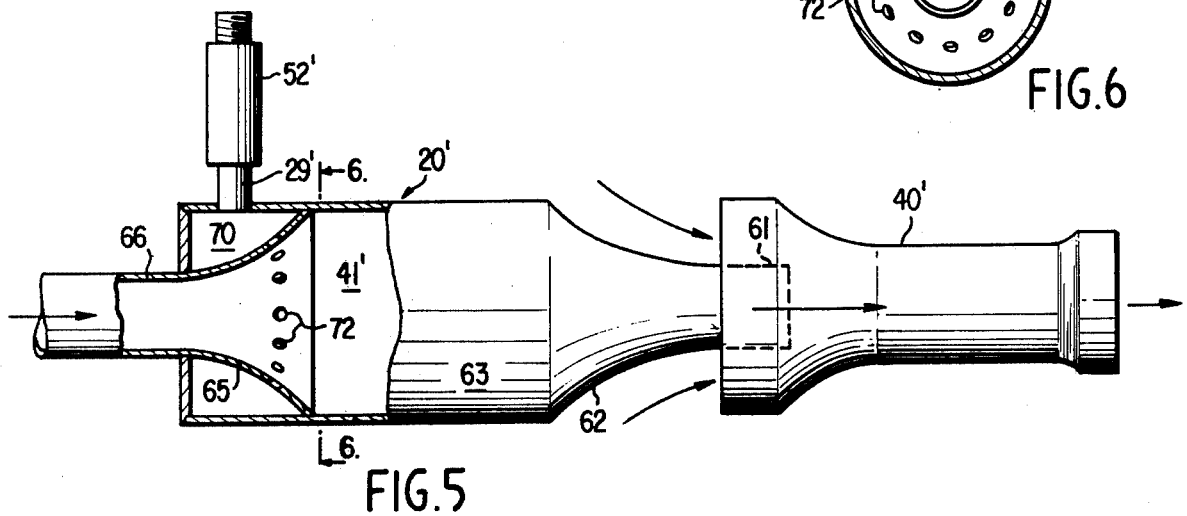
FIG. 5 is a side view, in section, of a preferred embodiment of a venturi pump according to the instant invention which is especially suitable for mixing fertilizers or like products.

Referring now to FIGS. 5 and 6, there is shown a preferred embodiment of a venturi pump 20' which has been found to be especially effective in mixing fertilizers in which the constituents contain sixty to seventy percent solids. The reactor 41' of the venturi pump 20' has an outlet nozzle 61 with a diameter substantially smaller then the inlet of the associated venturi tube 40'. The outlet nozzle 61 tapers out and back through a concave, frusto-conical section 62 to a cylindrical section 63 which serves as a reaction chamber. The cylindrical section 63 tapers down at its inlet end through a concave, frusto-conical cylindrical section 65 to a cylindrical inlet nozzle 66. The inlet nozzle 66 corresponds to the inlet 19 shown in FIGS. 2 and 3 and introduces the acid constituent into the reaction chamber 63.

An induction chamber 70 surrounds a portion of the inlet nozzle 66 and the frusto-conical section 65. The basic constituent is introduced through an inlet 29' which is connected to a flow check valve 52'. The basic constituent then passes through holes 72 distributed around the section 65 so as to mix with the acidic constituent and react in the chamber 63. Generally an induction tank pressure of 15 p.s.i. over the pressure in the reactor 41' is sufficient to handle all fluids utilized. As with the reaction jet disclosed in FIGS. 2 and 3, the resulting product exits through the nozzle 61 and entrains the product already in mixing tank 10.

By sloping the sections 62 and 65, any tendency for solids to build up within the reaction chamber is avoided. By making the nozzle 61 relatively small with respect to the cylindrical section 63, the material in the chamber is retained longer than the material in the chamber shown in FIG. 4 and, thus, the need for the baffles 53 is eliminated. The holes 72 are preferably angled or cantered which aids in cleaning the device and which provides additional venturi action or suction which aids in movement of the induction fluid, or basic constituent, from the induction chamber 70 to the reaction chamber 63.

With conventional spargers, excessive lumping occurs and high powered tank mixers are needed to break up and fluidize the mass within the tank 10. The neutralization of a 4.0 pH material such as monoammonium phosphate by using the reactor 41' of FIG. 5 does not produce as violent a reaction and surge to the venturi as the reaction jet of FIG. 3. However, neutralization of the heavy fluid or slurry within the reactor 20' is so fast that no lumping occurs and the need for heavy tank mixers is eliminated, thereby saving considerable electric power. Generally, since fast acid neutralization occurs in a high velocity flow, there is a considerable reduction in production time. While the venturi pump 20' shown in FIG. 5 is especially suitable for mixing and neutralizing fertilizer constituents containing sixty to seventy percent solids, it is also effective in mixing and neutralizing fertilizer constituents which are completely liquid, contain less solids and hava a pH of 1.0 or higher.

In the preferred embodiment, the reactors 41 and 41' are preferably mounted in the mixing tank 10, as is shown in the figures, however, the reactors may be mounted outside of the tank and be registered with the venturi tubes 40 and 40' by lines to form venturi pumps. If this approach is utilized, the reactors would need some type of cooling means, such as water-jackets.

While the venturi pumps 20 and 20' are shown with a particular mixing tank 10, it should be kept in mind that the venturi pumps could be adapted to mixing tanks already in the field.

The foregoing illustrations are to be considered merely descriptive of the invention, which is to be limited only by the following appended claims.

I claim:

1. An apparatus for reacting an acid reactant and base reactant and mixing the reaction product with said reactants, whereby the acid and base reactants are reacted and partially neutralized to salts, wherein lumping of the salts is avoided, said apparatus comprising:
   a mixing tank; and
   a venturi pump mounted in said mixing tank and comprising:
   a venturi tube having inlet and outlet ends;
   a reactor upstream of said venturi tube and comprising:
   a reaction chamber having a central wall portion which is cylindrical in cross-section and inlet and outlet ends which are smaller in diameter than the cylindrical portion and joined thereto, respectively, by first and second concave frusto-conical wall sections, said outlet ends of said reaction chamber forming a nozzle projecting into the inlet end of the venturi tube and a plurality of holes in said first concave frusto-conical wall section; and
   an induction chamber upstream from and adjacent said reaction chamber and overlying at least a portion of the first concave frusto-conical wall section and registering with the holes in the first concave frusto-conical wall section;
   first inlet means for introducing one of said reactants into said induction chamber, whereby said reactant may pass through the holes in said first concave frusto-conical wall section into said reaction chamber; and
   second inlet means for introducing the other reactant and the contents from the mixing tank directly into said reaction chamber through the inlet end of said reaction chamber without being introduced into said induction chamber;
   whereby the reaction between the acid and base reactants may take place in said reaction chamber to release energy which powers said venturi tube by expanding through said outlet end of said reaction chamber into said inlet end of said venturi tube.

2. The apparatus of claim 1 wherein the holes in said first concave frusto-conical wall section are cantered with respect to the central wall portion of said reaction chamber.

3. An apparatus for reacting a first reactant and a second reactant and mixing the product formed by said reaction and at least one of said reactants, said apparatus comprising:
   a mixing tank;
   outlet means in the bottom of the mixing tank for removing the contents of the mixing tank;
   first inlet means connected to said mixing tank for introducing said first reactant into said mixing tank;
   a venturi pump comprising:
   a venturi tube disposed within said mixing tank and having inlet and outlet ends;
   a reactor upstream of said venturi tube and having inlet and outlet ends and comprising:
   an induction chamber at the inlet end of said reactor;
   second inlet means for introducing said second reactant into said induction chamber;
   a reaction chamber at the outlet end of said reactor;
   a perforated wall separating and communicating said induction chamber and said reaction chamber whereby said second reactant can flow from said induction chamber into said reaction chamber;
   a nozzle at the outlet end of said reactor and in fluid flow communication with said reaction chamber, said nozzle projecting into the inlet end of said venturi tube;
   first pipe means connecting and communicating the outlet means of said mixing tank with said reaction chamber of said venturi pump;
   auxiliary pump means associated with said pipe means and between said outlet means and said venturi pump for circulating the contents from said mixing tank into and through tthe venturi pump; and
   cooling means located around said reaction chamber for cooling said reaction chamber;
   whereby energy released upon the reaction of said first and second reactants in said reaction chamber powers said venturi pump and whereby fluid leaving said nozzle will create a low pressure in said venturi tube to thereby draw the contents in the mixing tank which are adjacent to the inlet end of said venturi tube into said venturi tube to promote mixing between the contents from said mixing tank and reaction product from said reaction chamber.

4. The apparatus of claim 3 wherein second valve means is disposed in the outlet means in said mixing tank so that said mixing tank can be emptied without operating said auxiliary pump means.

5. The apparatus of claim 3 wherein said reactor of said venturi pump is also disposed within said mixing tank.

6. The apparatus of claim 3 which further comprises first valve means disposed in said first pipe means between said auxiliary pump means and said venturi pump; an outlet pipe connected in flow communication with said first pipe means and downstream of said first valve means and said venturi pump whereby selective operation of said first valve means directs the contents from said mixing tank either through said venturi pump or through said outlet pipe.

7. The apparatus of claim 6 wherein second valve means is disposed in the outlet means in said mixing tank so that said mixing tank can be emptied without operating said auxiliary pump means.

8. The apparatus of claim 7 which further comprises a second venturi pump disposed within said mixing tank, second pipe means connecting and communicating said outlet means of said mixing tank and said second venturi pump, and second auxiliary pump means associated with said second pipe means and between said second venturi pump and said outlet means in said mixing tank and wherein said venturi pump is powered by said second auxiliary pump means.

9. The apparatus of claim 8 which further comprises third valve means disposed in said second pipe means between said second auxiliary pump means and said second venturi pump, and a second outlet pipe connected in flow communication with said second pipe means and downstream of said second valve means and said second venturi pump whereby selective operation of said second valve means directs the contents from said mixing tank either through said second venturi pump or through said second outlet pipe.

10. The apparatus of claim 3 wherein said perforated wall is annular in shape and has a center opening and said first pipe means communicates with the center opening whereby the contents from said mixing tank enters said reaction chamber through said first pipe means and is excluded from said induction chamber.

11. The apparatus of claim 10 wherein said reaction chamber is circular in cross-section and further comprises a plurality of baffles therein which are angled toward said outlet end of said reactor and which extend into said reaction chamber a distance no greater than the distance from the reaction chamber to the center opening of said annular perforated wall, wherein when the reaction between the first and second reactants is taking place in said reaction chamber, said baffles promote mixing of the constituents and, when no reaction is taking place in said reaction chamber, the contents from said mixing tank moves relatively freely through said reaction chamber without impedance from said baffles.

12. The apparatus of claim 3 wherein said perforated wall is a perforated concave frusto-conical wall expanding from the inlet end of said reactor towards said reaction chamber, said induction chamber overlying at least a portion of said perforated concave frusto-conical wall and said first pipe means being in flow communication with said reaction chamber of said venturi pump through said perforated concave frusto-conical wall; and said nozzle is connected to said reaction chamber through a second concave frusto-conical wall which expands from the nozzle towards said reaction chamber.

13. The apparatus of claim 12 wherein said perforation of said perforated concave frusto-conical wall are holes which are cantered with respect to the surface of said reactor.

14. A venturi pump for mixing a product of a first reactant and a second reactant with said reactants, comprising:
a venturi tube having inlet and outlet ends;
a reactor having inlet and outlet ends and comprising:
an induction chamber at said inlet end of said reactor;
first inlet means for introducing one of said reactants into said induction chamber;
a reaction chamber having a circular cross-section wall adjacent to said induction chamber and between said induction chamber and said venturi tube, said reaction chamber terminating at its downstream end in a nozzle which projects into said inlet end of the venturi tube; and
an annular perforated wall having a center opening, said perforated wall separating and communicating the induction chamber and the reaction chamber;
second inlet means in registry with said center opening for directing flow of said product and said reactant into the reaction chamber without permitting flow into said induction chamber;
said reaction chamber including a plurality of baffles therein which are angled toward said outlet end of said reactor and which extend into said reaction chamber a distance no greater than the distance from said reaction chamber wall to the periphery of the center opening of said annular perforated wall;
whereby energy released upon the reaction of said first and second reactants in said reaction chamber powers said venturi pump and whereby fluid leaving said nozzle will create a low pressure in said venturi tube to thereby suck fluid adjacent to the inlet of said venturi tube into the venturi tube to promote mixing between the adjacent fluid and the fluid product leaving said nozzle, and
wherein when the reaction between said reactants is taking place in said reaction chamber said baffles promote mixing of said reactants and said product and when no reaction is taking place in said reaction chamber said product moves freely through said reaction chamber without impedance from said baffles.

* * * * *